US007600495B2

(12) United States Patent
Rollinger et al.

(10) Patent No.: US 7,600,495 B2
(45) Date of Patent: Oct. 13, 2009

(54) METHOD FOR CONTROLLING AN ENGINE HAVING VARIABLE CAM TIMING

(75) Inventors: John E. Rollinger, Sterling Heights, MI (US); Paul A. Pietrzyk, Beverly Hills, MI (US); Michael Sweppy, Manchester, MI (US); Eric A. Luehrsen, Royal Oak, MI (US); Robert M. Grant, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 661 days.

(21) Appl. No.: 11/209,452

(22) Filed: Aug. 23, 2005

(65) Prior Publication Data

US 2007/0044742 A1 Mar. 1, 2007

(51) Int. Cl.
*F01L 1/34* (2006.01)
(52) U.S. Cl. .................. 123/90.15; 123/90.17; 123/347
(58) Field of Classification Search ............... 123/90.15, 123/90.16, 90.17, 90.18, 90.27, 90.31, 345, 123/346, 347, 348
See application file for complete search history.

(56) References Cited

U.S. PATENT DOCUMENTS

| | | | | |
|---|---|---|---|---|
| 6,491,022 B2 * | 12/2002 | Okamoto | ..................... | 123/396 |
| 6,804,601 B2 * | 10/2004 | Wang et al. | ................. | 701/107 |
| 6,805,096 B2 * | 10/2004 | Iizuka | ................... | 123/406.18 |
| 7,107,951 B2 * | 9/2006 | Urushihata et al. | ....... | 123/90.17 |

* cited by examiner

*Primary Examiner*—Ching Chang

(57) ABSTRACT

A method for operating an engine having a variable cam timing control system, for controlling a camshaft angle in such engine. The method includes deactivating the variable cam timing system and setting the camshaft angle to a predetermined angle for a predetermined duration after failure in a sensor used to control the variable cam timing system and then reactivating the variable cam timing system after such predetermined time. The deactivating continues during the predetermined duration in the presence of a subsequent failure of the sensor during the predetermined duration. The reactivating comprises driving the cam angle to a camshaft angle established by the variable cam timing system in a predetermined manner. The reactivating occurs over a predetermined reactivation time.

22 Claims, 13 Drawing Sheets

METHOD FOR CONTROLLING AN ENGINE HAVING VARIABLE CAM TIMING

TECHNICAL FIELD

This invention relates generally to a method for operating an engine having a variable cam timing (VCT) control system for controlling a camshaft angle in such engine and more particularly to methods for operating such engine in the event of a fault in a sensor used in such VCT control system.

BACKGROUND

As is known in the art, engines have utilized variable cam timing (VCT) mechanisms to control the opening and closing of intake valves and exhaust valves communicating with engine cylinders. In particular, each VCT mechanism is usually utilized to adjust a position of a camshaft (which actuates either intake valves or exhaust valves or both) with respect to a crankshaft position. By varying the position of the camshaft (i.e., camshaft angle) with respect to the position of the crankshaft, engine fuel economy can be increased and engine emissions can be decreased.

One VCT system uses a closed loop system to trim continually between retarding and advancing the camshaft angle to prevent drifting to either the full advance or full retard positions. The sensors used for this closed-loop controller are the Cylinder Identification sensors (CID), and usually of the Variable Reluctance type. Various schemes have been employed in the placement target teeth and the processing of this signal in order to flag when the signals are invalid. When the CID signal is lost or corrupted, a failure flag is set for each CID sensor that is bad.

Various techniques have been suggested to respond to the detection of when a CID tooth signal is invalid (i.e., a missing tooth, a tooth at an incorrect angle, too many teeth after one engine revolution, for example). One technique immediately disables the VCT and resets the camshaft angle to a target, i.e., a predetermined camshaft angle with respect to the position of the crankshaft (sometimes referred to as the base or target timing), during when the failure is detected and immediately re-enables the VCT after failure is gone. The technique is illustrated with reference to FIGS. 1A through 1F. FIG. 1A shows the camshaft angle in the absence of a CID failure. FIG. 1B shows the camshaft angle in response to a single CID failure at time T1 and lasting a relatively short time T2-T1. It is noted that the VCT is disabled during the time from T1 to T2 and is then reactivated at time T2. During the duration between T1 and T2 the camshaft angle to the target, i.e., the predetermined camshaft angle with respect to the position of the crankshaft (sometimes referred to as the base timing). FIG. 1C illustrates a case where there is a low frequency CID error condition and FIG. 1D illustrates where there is a high frequency CID condition. Again it is noted that the VCT is disabled during the time of the CID errors and is then reactivated in the absence of such CID errors. FIGS. 1E and 1F illustrate a low frequency CID error of varying failure duration and a continuous CID error condition, respectively.

Another technique suggested responds to the detection of when a CID tooth signal is invalid is to permanently disable the VCT after an extended period of continuous failure, i.e., after a predetermined failure time threshold level, T. Responses to such technique are illustrated in FIGS. 2A through 2D. It is noted that in FIGS. 2A-2C the CID failure duration is short compared to the predetermined failure time threshold, T. On the other hand, FIG. 2D illustrates a condition where the CID failure duration is greater than the predetermined failure time threshold, T and hence the VCT is disabled after the time T from the CID failure detection.

SUMMARY

In accordance with the present invention, a method is provided for operating an engine having a variable cam timing control system, for controlling a camshaft angle in such engine. The method includes setting the camshaft angle to a predetermined angle for a predetermined duration after failure in a sensor used to control the variable cam timing system; and subsequently allowing the camshaft angle to return to the camshaft angle determined by the variable cam timing system.

The predetermined duration may be, for example, a predetermined time duration or a predetermined number of engine revolutions.

In one embodiment, the camshaft angle setting continues during the predetermined duration in the presence of a subsequent failure of the sensor during the predetermined duration.

In one embodiment, the camshaft angle is allowed to return to the camshaft angle determined by the variable cam timing system by driving the cam angle to a camshaft angle established by the variable cam timing system in a predetermined manner.

In one embodiment the camshaft angle is allowed to return to the camshaft angle determined by the variable cam timing system by driving the cam angle to a camshaft angle established by the variable cam timing system in a predetermined manner over a predetermined reactivation time.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
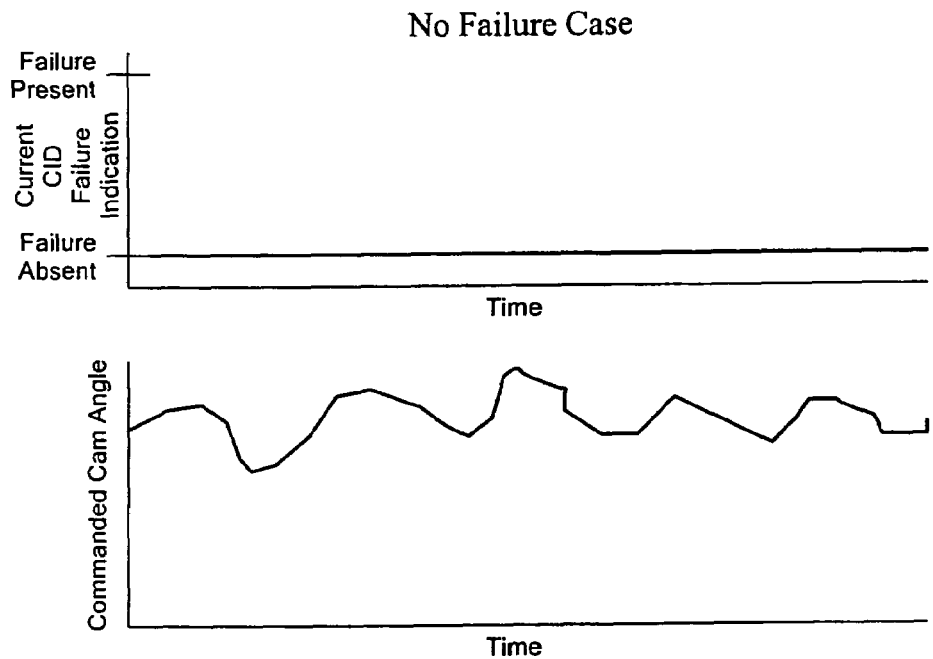
FIGS. 1A-1F are timing histories of CID sensor fault/no-fault conditions and camshaft angle in response to such CID condition for a variety of sensor conditions according to a PRIOR ART control method.
Figure 1B:
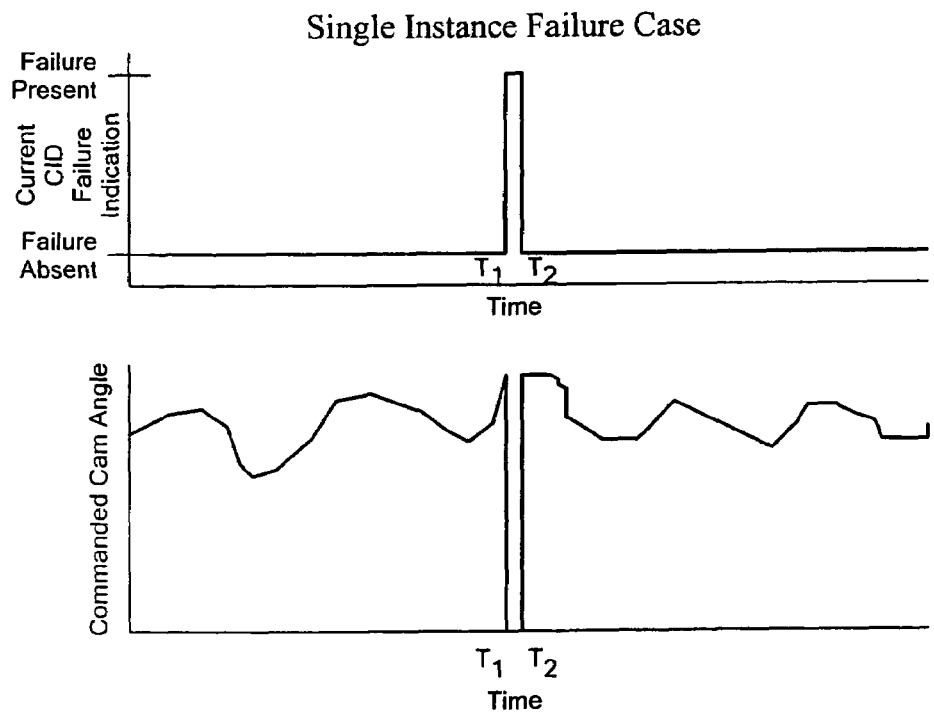
Figure 1C:
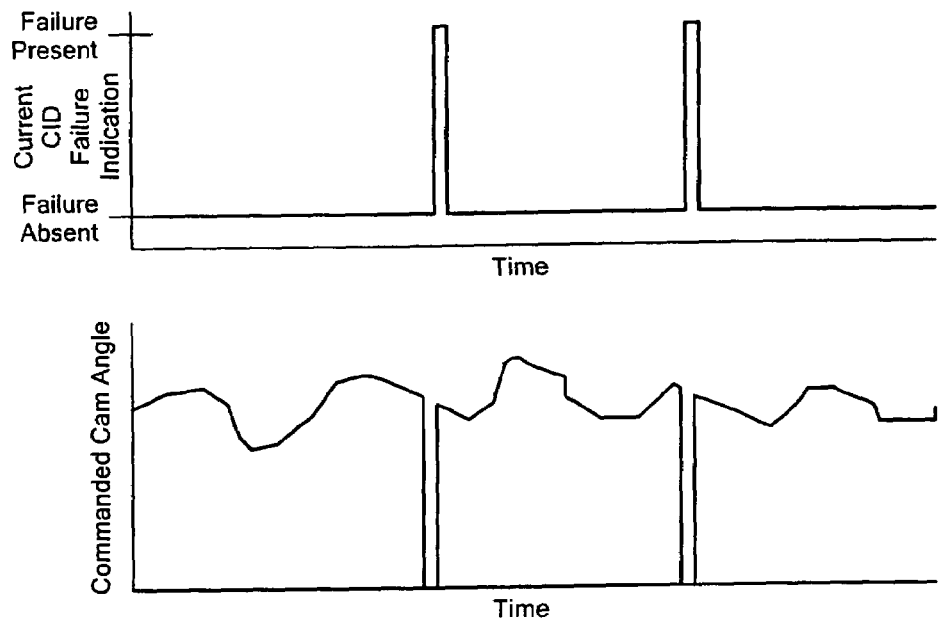
Figure 1D:
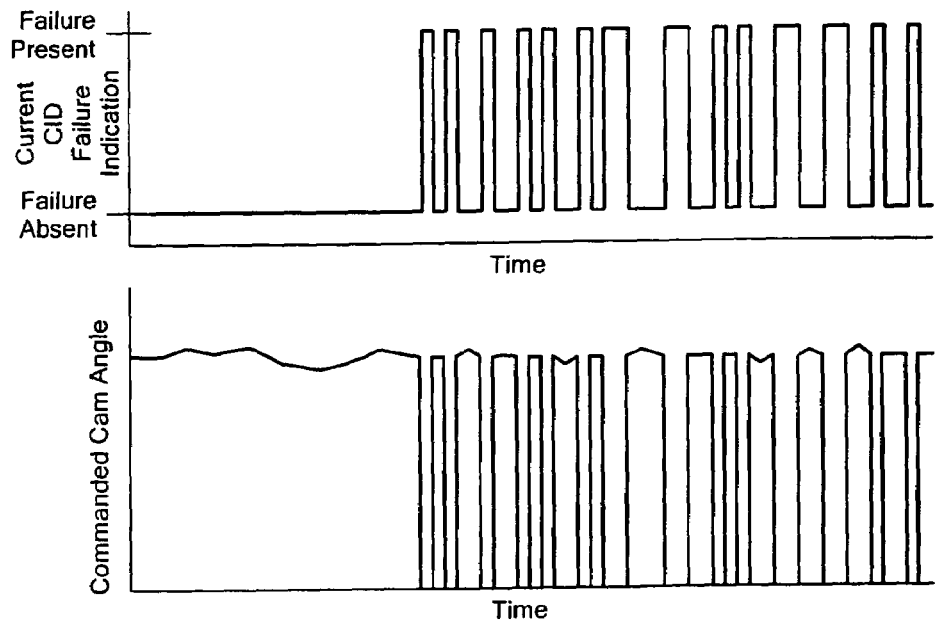
Figure 1E:
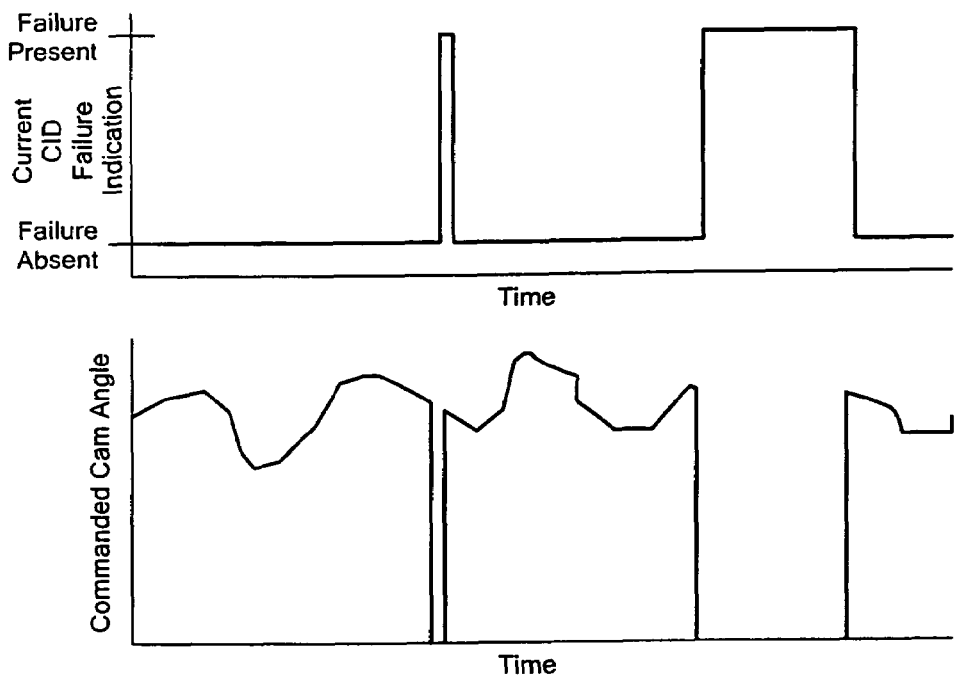
Figure 1F:
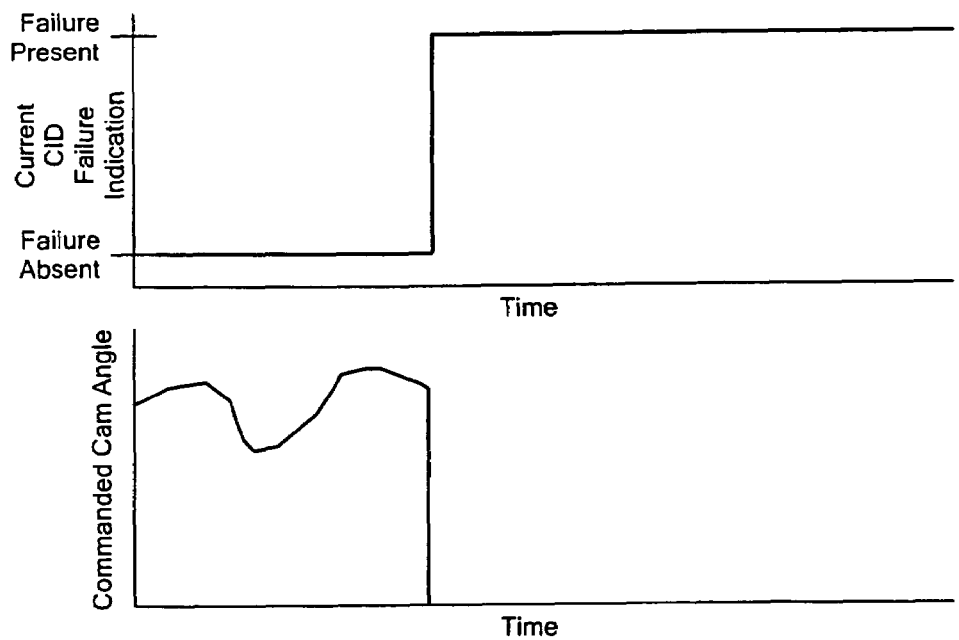
Figure 2A:
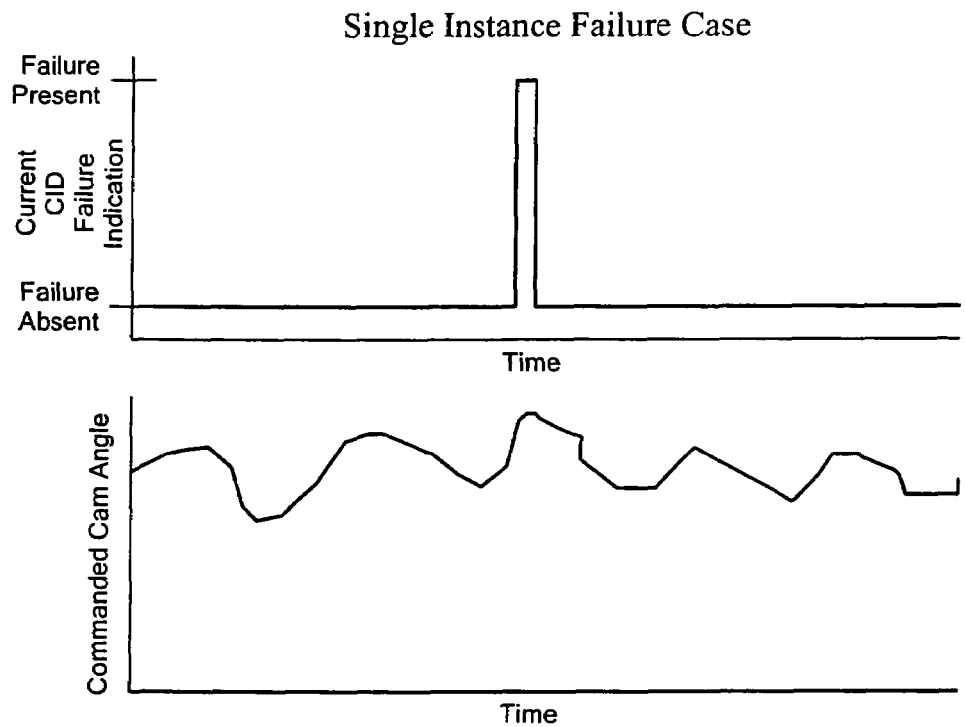
FIGS. 2A-2D are timing histories of CID sensor fault/no-fault conditions and camshaft angle in response to such CID condition for a variety of sensor conditions according to a second PRIOR ART control method.
Figure 2B:
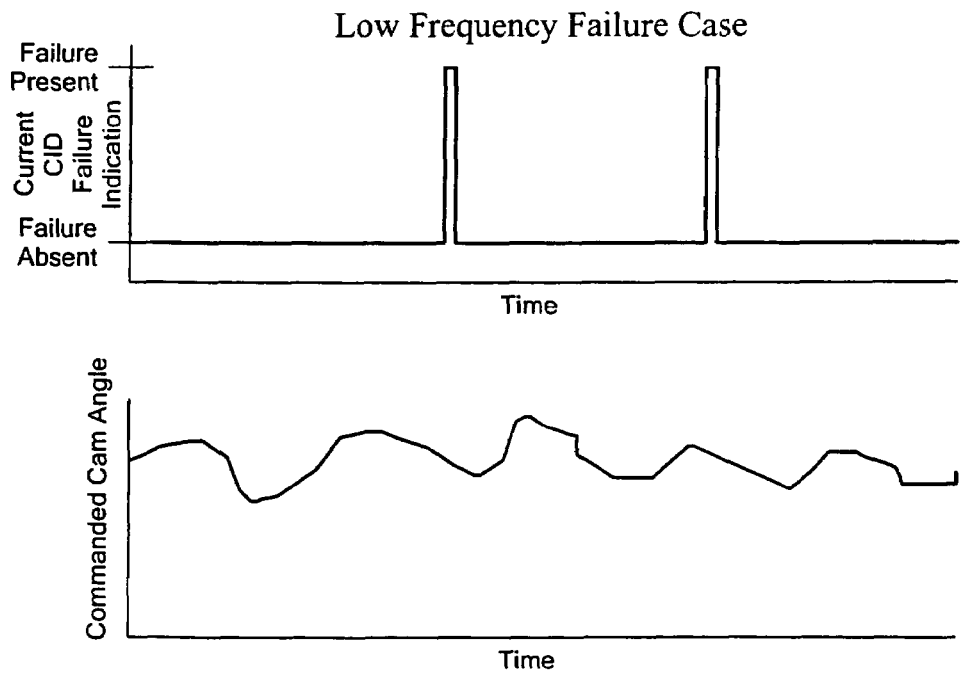
Figure 2C:
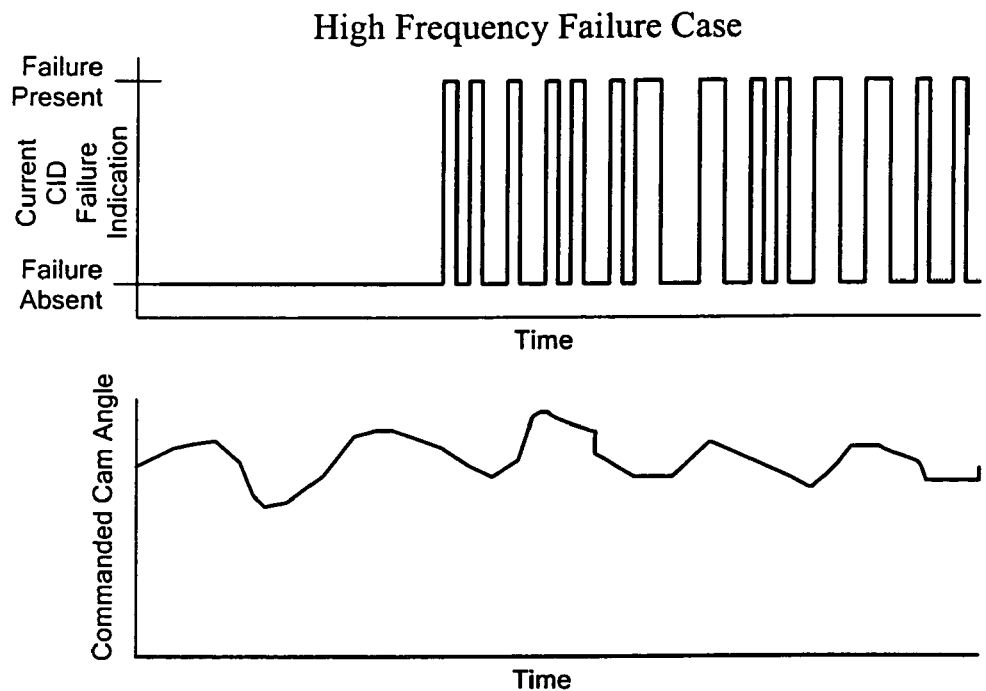
Figure 2D:
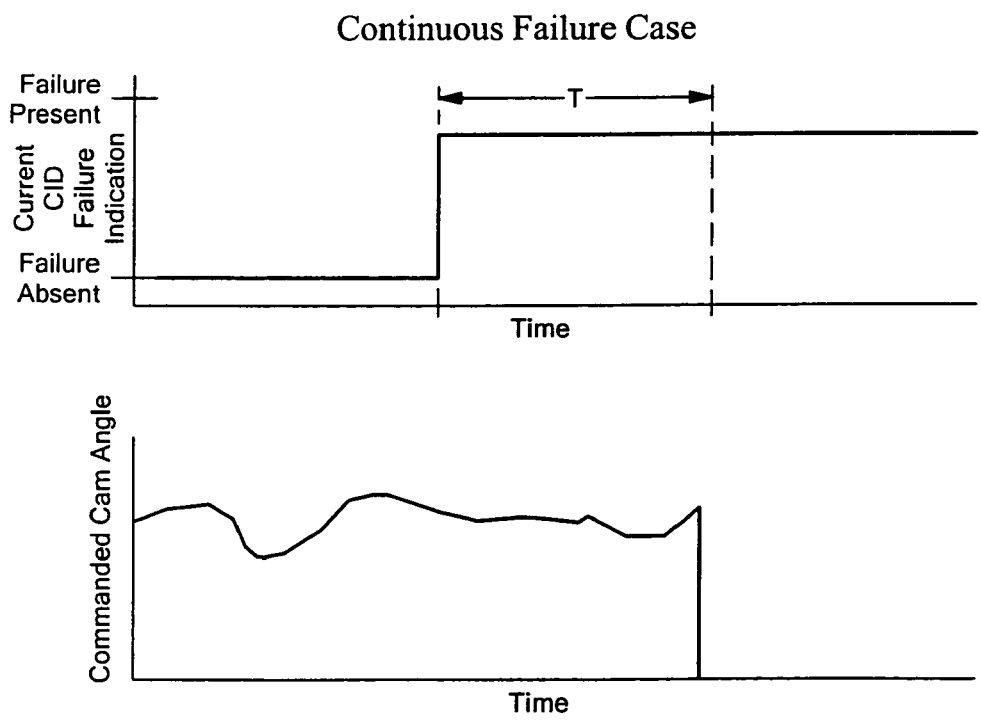
Figure 3:
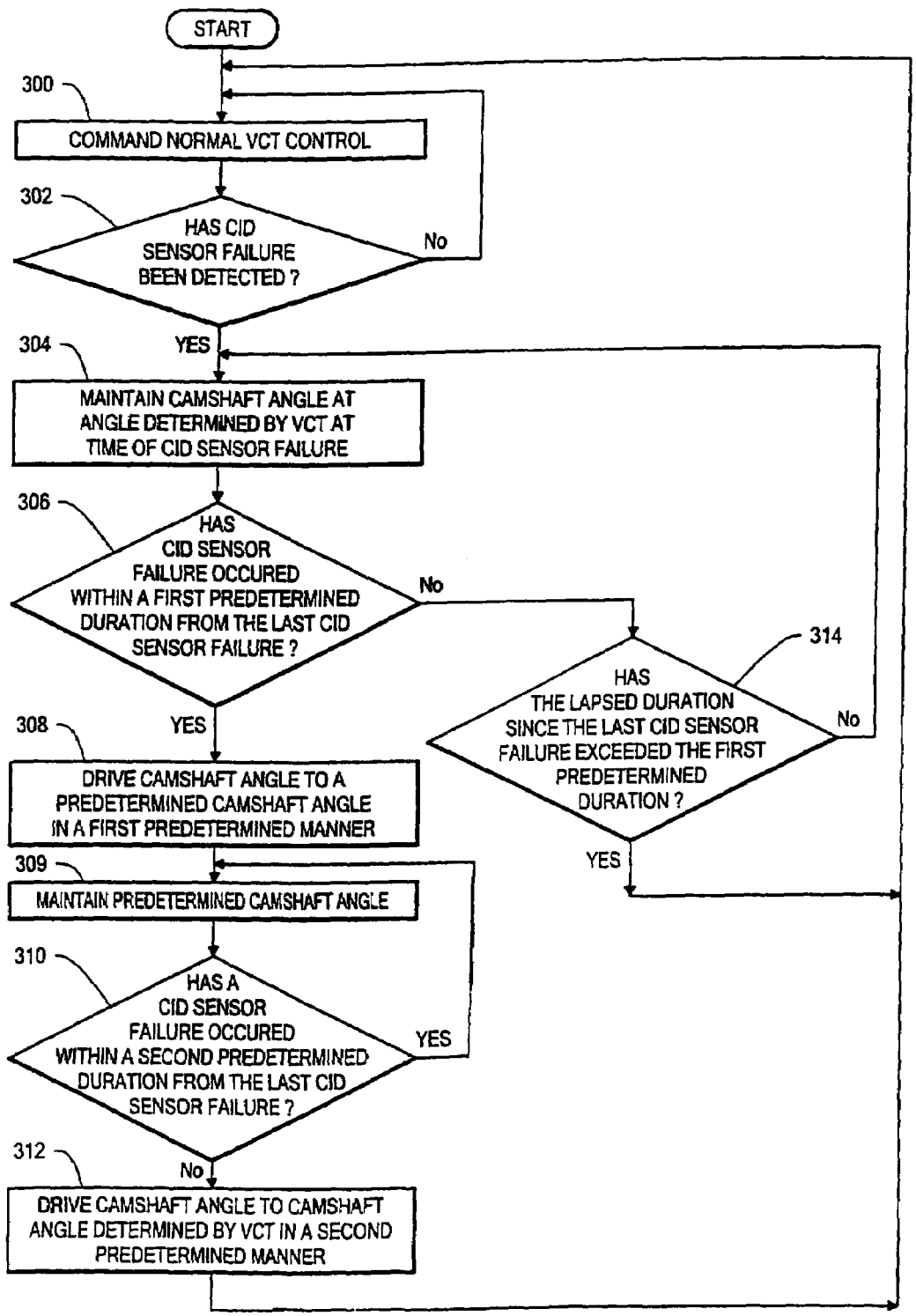
FIG. 3 is a flow diagram of a method for operating an engine having a variable cam timing control system to control a camshaft angle in such engine according to the invention.

Referring now to FIG. 3, a flow diagram is shown of a method for operating an internal combustion engine having a variable cam timing control system, for controlling a camshaft angle in such engine. In Step 300, the VCT system begins by providing a normal VCT command. In the absence of a CID sensor failure, the process in Step 300 continues; however, if a CID sensor failure is detected, Step 302, the VCT system maintains the camshaft at the angle determined at the time of the CID sensor failure for a first predetermined duration, here a time duration A, Step 304.

The process, in Step 306, determines whether there has been a CID sensor failure within the first predetermined time duration from the last CID sensor failure. If there has been a failure during the first duration, the VCT system drives the camshaft to a constant position in a first predetermined manner over a first predetermined time $\Delta_1$, Step 308. This camshaft angle is maintained by the VCT system for a second predetermined duration, here B, Step 309. The VCT system determines whether there has been a CID sensor failure within this second predetermined duration, B, from the last CID sensor failure, Step 310. In the absence of a CID sensor failure, the VCT system drives the camshaft to the camshaft position determined by normal VCT control system operation, Step 312 and the process continues by returning to Step 300. The predetermined manner may be, for example, a series of incremental step changes in camshaft angle, a ramp-like change in camshaft angle, a function of a difference between a camshaft angle established by the variable cam timing system and a current camshaft angle, a polynomial function, or an exponential function.

However, if in Step 306, the process determines that there has not been a failure during the first duration, A, the VCT system determines whether there has been a lapse since the last CID sensor failure which exceeds the first duration, A, Step 314. If there has been a lapse, the process continues by returning to Step 300. On the other hand, if there has not been a lapse, the process returns to Step 304, in which case: The process in Step 300 continues; however, if a CID sensor failure is detected, Step 302, the VCT system maintains the camshaft at the angle determined at the time of the CID sensor failure for a first predetermined duration, here a time duration A, Step 304. The process, in Step 306, determines whether there has been a CID sensor failure within the first predetermined time duration from the last CID sensor failure. If there has been a failure during the first duration, the VCT system drives the camshaft to a constant position in a first predetermined manner, over the first predetermined time $\Delta_1$, Step 308. This camshaft angle is maintained by the VCT system for a second predetermined duration, here B, Step 309. The VCT system determines whether there has been a CID sensor failure within this second predetermined duration, B, from the last CID sensor failure, Step 310. In the absence of a CID sensor failure, the VCT system drives the camshaft to the camshaft position determined by normal VCT control system operation over a predetermined activation time. $\Delta_2$, Step 312 and the process continues by returning to Step 300. In the presence of a CID sensor failure, the process returns to Step 309 and the camshaft angle is maintained by the VCT system another time for the second predetermined duration, here B.

The process described above is illustrated in examples shown in FIGS. 4A through 4C. It is noted that in the absence of a detected CID sensor failure the VCT operates in a normal manner, Step 300. It should be understood that the process described above is used for each of multiple, or both as a pair of, CID sensors in an engine having a plurality of such sensors.

Figure 4A:
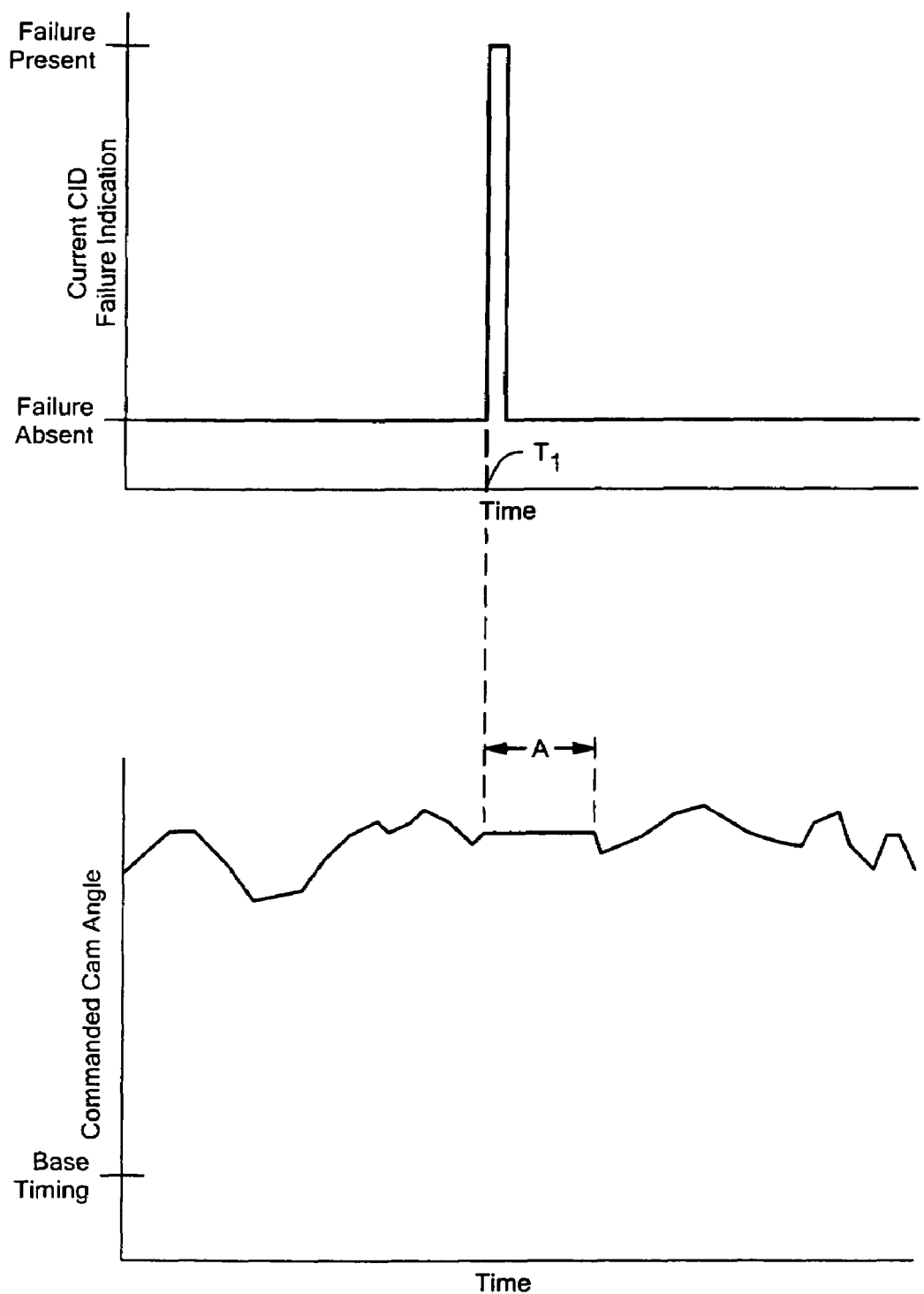
FIGS. 4A-4C are timing histories of CID sensor fault/no-fault conditions and camshaft angle in response to such CID condition for a variety of sensor conditions according to the invention.

Considering the example shown in FIG. 4A, such example is a case where there is a CID sensor failure detected at time $T_1$ in Step 302. In accordance with Step 304, the camshaft angle is maintained at the angle determined by the VCT system at the time of the sensed failure, i.e., at time $T_1$, for a first predetermined time, A. In this example, there is no detected CID sensor failure during the first predetermined duration, A, so that, as described in Step 306, the process proceeds to Step 314 to determine whether the lapsed duration since the last detected CID sensor failure has exceeded the first predetermined duration A. In this example, there has not been a "last" detected CID sensor failure so that, according to step 314, the process returns to Step 304 where the camshaft angle is maintained at the angle determined by the VCT system at the time of the sensed failure, i.e., at time T, for a first predetermined time, A.

Figure 4B:
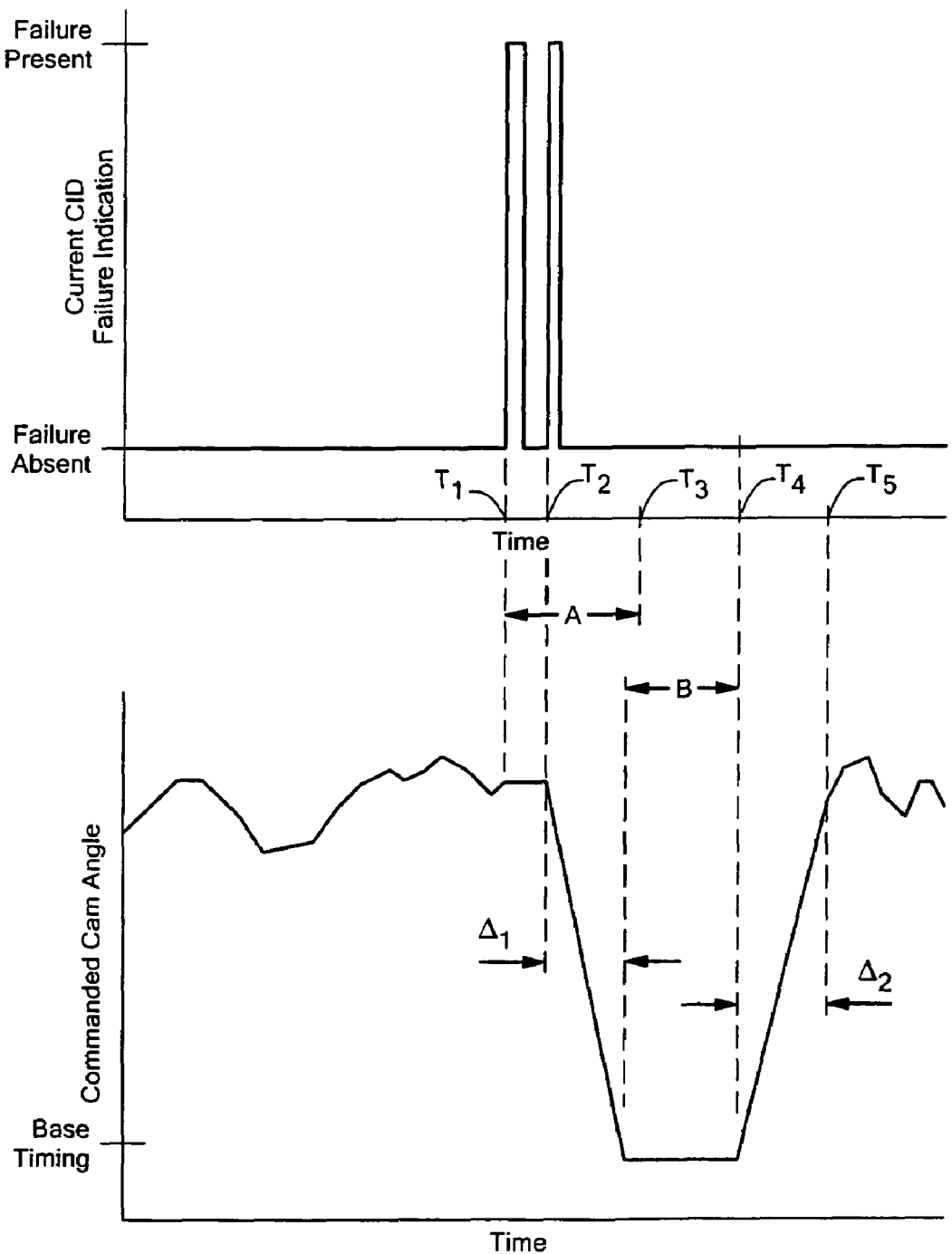

FIG. 4B illustrates a case where there is a first CID sensor failure detected at time $T_1$ and a second CID sensor failure detected at time $T_2$ where the time $T_2$ occurs within the first predetermined duration, A. Thus, in accordance with Step 302, a CID sensor failure is detected at time $T_1$. In accordance with Step 304, the camshaft angle is maintained at the angle determined by the VCT system at the time of the sensed failure, i.e., at time T, for a first predetermined time, A. In accordance with step 306, prior to $T_2$, a subsequent failure has not occurred yet. In accordance with step 314, the lapsed duration has not been exceeded, thus the process proceeds back to step 304 where the angle is maintained. In accordance with Step 306, at $T_2$ a CID sensor failure is detected within the first predetermined time, A. Therefore, the process proceeds to step 308. In accordance with Step 308, the camshaft angle is set, or driven, to a predetermined camshaft angle in a predetermined manner, here a linear ramp function, over an activation time $\Delta_1$. The camshaft is maintained at this predetermined camshaft angle, Step 309, for the second predetermined duration, here for time duration, B. The process proceeds to Step 310 to determine whether a CID sensor failure is detected within this second predetermined time duration, B. Here, in this example there are no CID sensor failures detected within this second predetermined time duration, B ending here at time $T_4$. This, in accordance with Step 312, the camshaft is driven to the camshaft angle determined by the VCT system in a second predetermined manner, here in this example, also a ramp function, over a predetermined reactivation time, $\Delta_2$, ending at time $T_5$ and the process returns to Step 300.

Figure 4C:
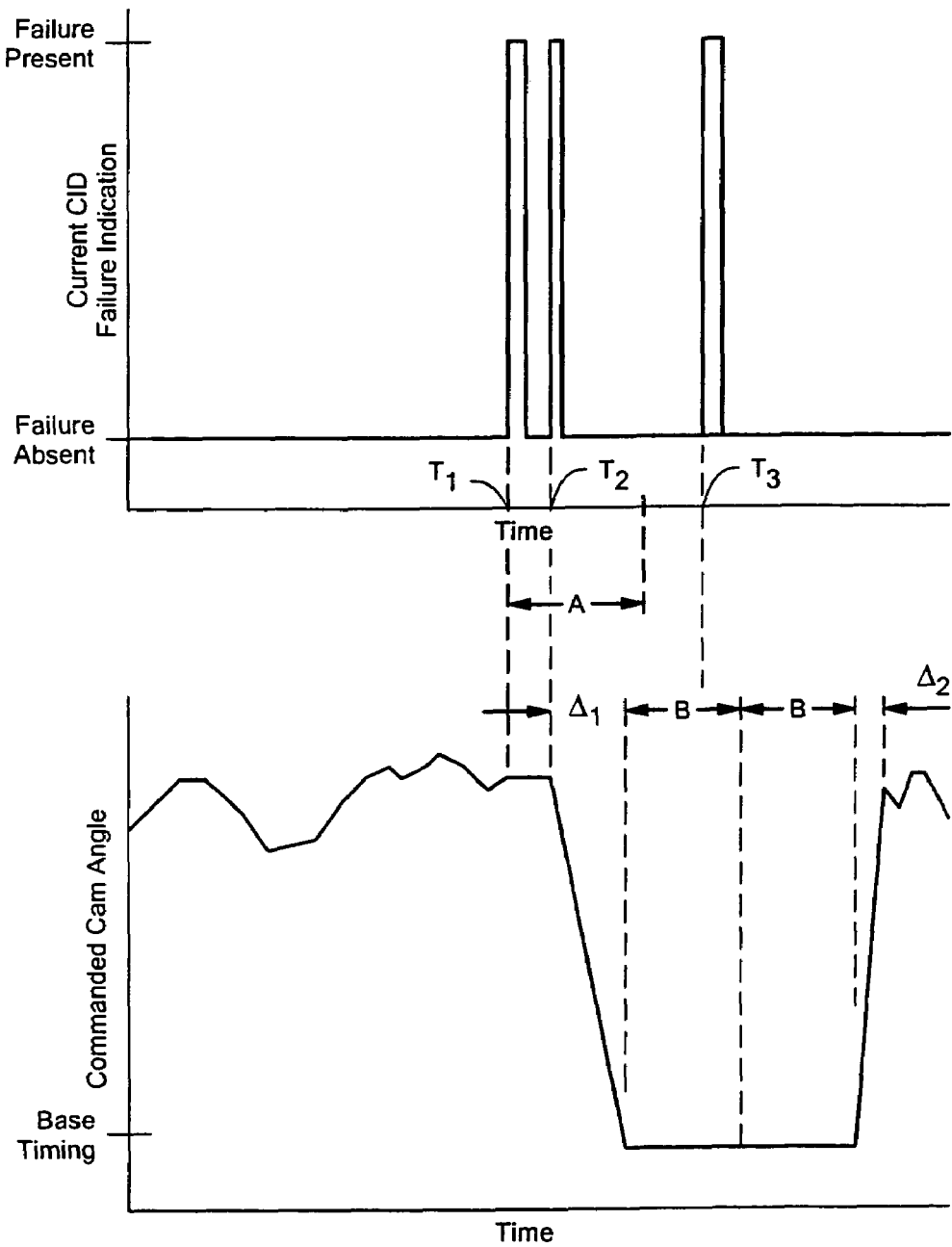

FIG. 4C illustrates a case where there is a first CID sensor failure detected at time $T_1$, a second CID sensor failure detected at time $T_2$ where the time $T_2$ occurs within the first predetermined duration, A, and a third CID sensor failure detected at time $T_3$ where the time $T_3$ occurs within the second predetermined duration, B. Thus, in accordance with Step 302, a CID sensor failure is detected at time $T_1$. In accordance with Step 304, the camshaft angle is maintained at the angle determined by the VCT system at the time of the sensed failure, i.e., at time T, for a first predetermined time, A. In accordance with Step 306, a CID sensor failure is detected within the first predetermined time, A. Therefore, the process proceeds to step 308. In accordance with Step 308, the camshaft angle is set, or driven, to a predetermined camshaft angle in a predetermined manner, here a linear ramp function, over the predetermined time, $\Delta_1$. The camshaft is maintained at this predetermined camshaft angle, Step 309, for the second predetermined duration, here for time duration, B. The process proceeds to Step 310 to determine whether a CID sensor failure is detected within this second predetermined time duration, B. Here, in this example there is a CID sensor failure detected at time $T_3$ within this second predetermined time duration, B. Thus, in accordance with Step 310, the process returns to Step 309. The camshaft is therefore maintained at this predetermined camshaft angle, Step 309, for the second predetermined duration, here for again for the time duration, B. The process proceeds to Step 310 to determine whether a CID sensor failure is detected within this second predetermined time duration, B. Here, in this example there are no CID sensor failures detected within this second predetermined time duration, B, here at time $T_4$. Thus, in accordance with Step 312, the camshaft is driven to the camshaft angle determined by the VCT system in a second predetermined manner, here in this example, also a ramp function, over a predetermined reactivation time, $\Delta_2$, and the process returns to Step 300.

Figure 5:
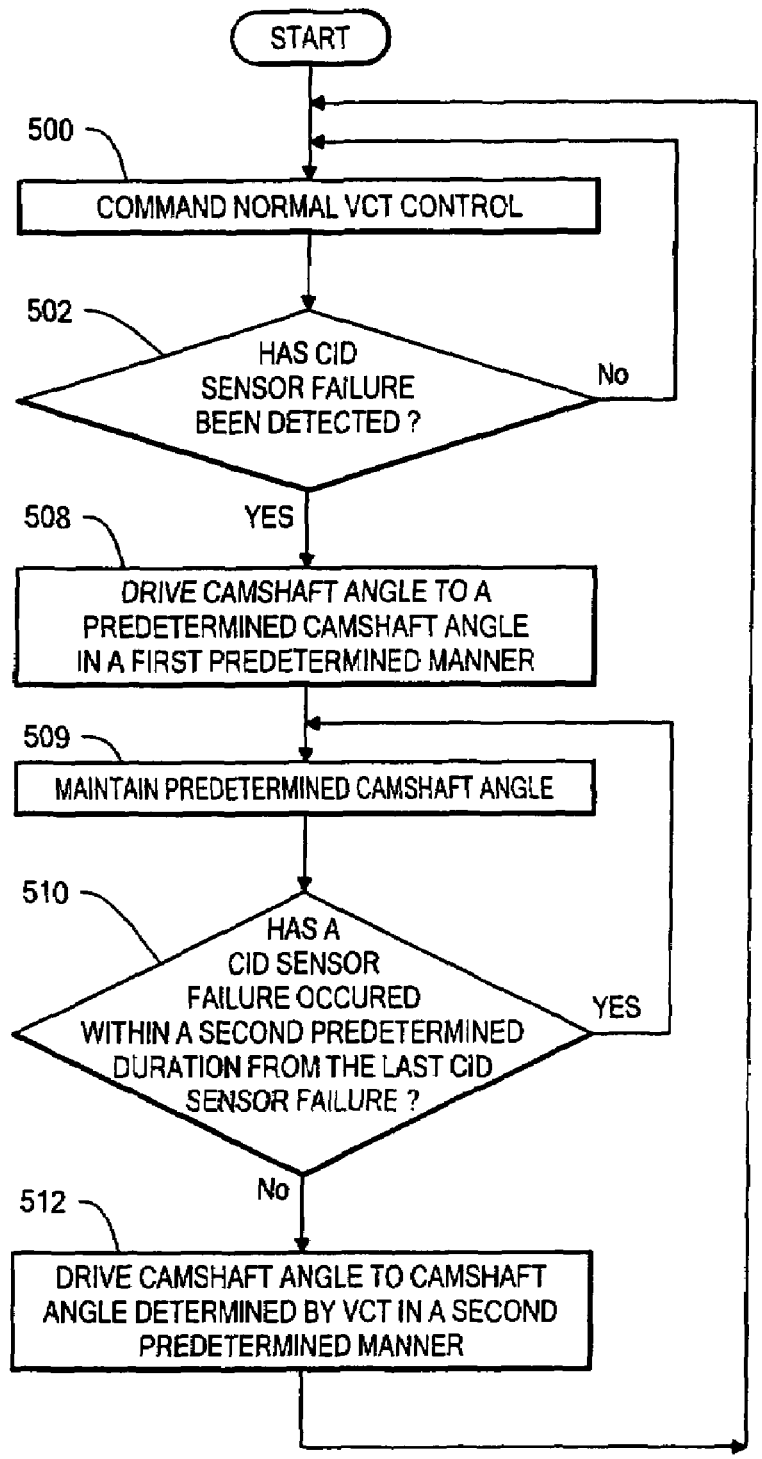
FIG. 5 is a flow diagram of a method for operating an engine having a variable cam timing control system to control a camshaft angle in such engine according to another embodiment of the invention.

Referring now to FIG. 5, an alternative process is shown. Here, the camshaft does not wait the first predetermined time A but rather drives the camshaft to the predetermined angle immediately, in a step function, upon detection of a CID sensor fault.

In Step 500, the VCT system begins by providing a normal VCT command. In the absence of a CID sensor failure, the process in Step 500 continues; however, if a CID sensor failure is detected, Step 502, the VCT system drives the camshaft to a constant position in a first predetermined manner, Step 508. This camshaft angle is maintained by the VCT system for a second predetermined duration, here B, Step 509. The VCT system determines whether there has been a CID sensor failure within this second predetermined duration, B, from the last CID sensor failure, Step 510. In the absence of a CID sensor failure, the VCT system drives the camshaft to the camshaft position determined by normal VCT control system operation, Step 512 and the process continues by returning to Step 500. The predetermined manner may be, for example, a series of incremental step changes in camshaft angle, a ramp-like change in camshaft angle, a function of a difference between a camshaft angle established by the variable cam timing system and a current camshaft angle, a polynomial function, or an exponential function. If there has been detection of a CID sensor fault during the predetermined time duration B, the process returns to Step 509.

Figure 6:
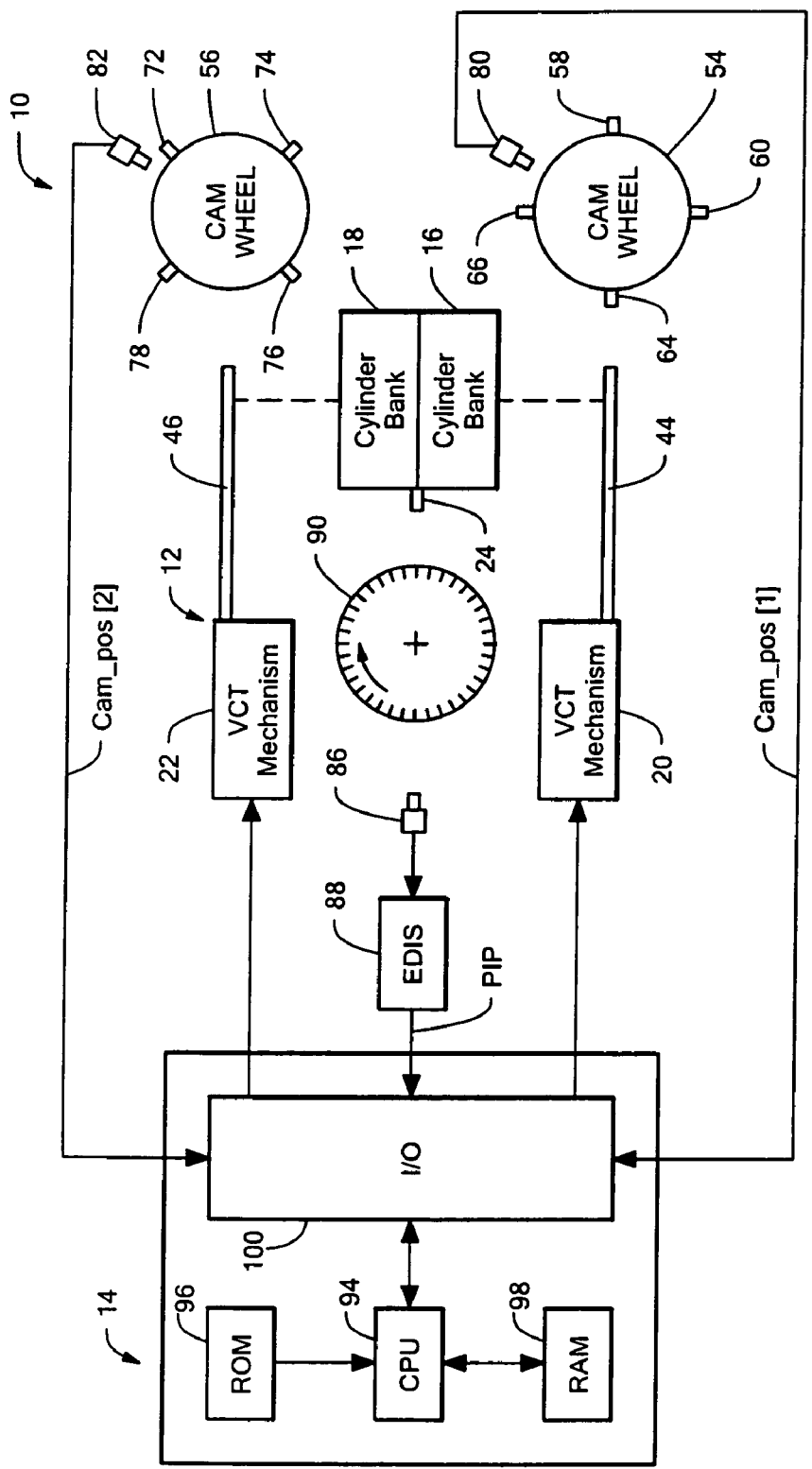
FIG. 6 is a diagrammatical sketch of an engine having a VCT control system for operating in accordance with the method of either FIG. 3 or FIG. 5.
Figure 6A:
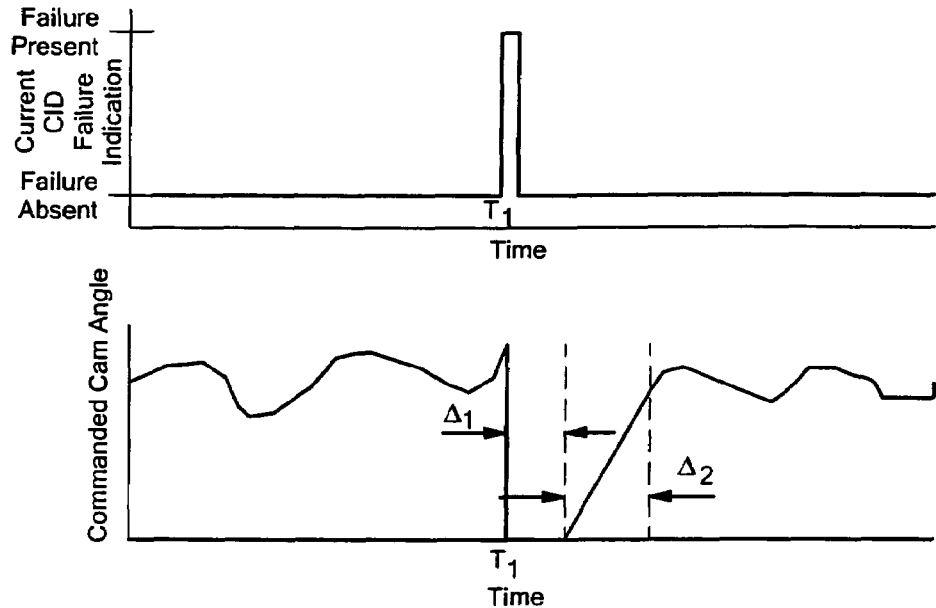
FIGS. 6A-6D are timing histories of CID sensor fault/no-fault conditions and camshaft angle in response to such CID condition for a variety of sensor conditions according to the method of FIG. 5.
Figure 6B:
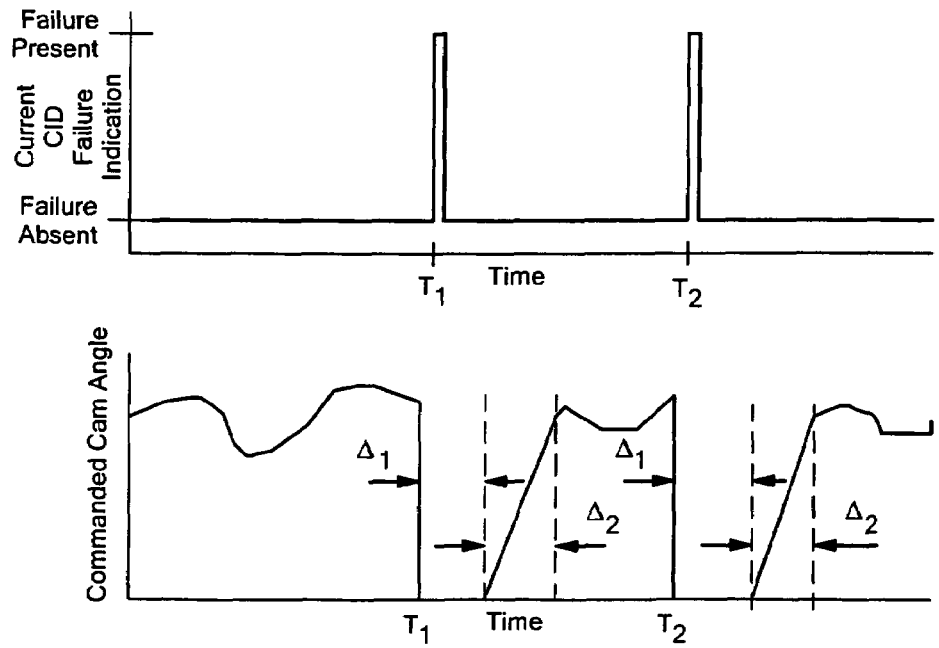

The process described above is connection with FIG. 5 is illustrated in FIGS. 6A through 6D. FIG. 6A illustrates a case where there is a CID sensor failure at time $T_1$. The failure exists for a duration less than the predetermined time, $\Delta_1$. Thus, at time $T_1$ the camshaft angle is set to a predetermined camshaft angle for the predetermined time, $\Delta_1$, after which the variable cam timing system allows the camshaft angle to return to the camshaft angle determined by the variable cam timing system over the predetermined reactivation time, $\Delta_2$. The camshaft angle at the end of the reactivation time, $\Delta_2$, is established by the variable cam timing system. During the predetermined reactivation time, $\Delta_2$, the camshaft is driven in a predetermined manner to a camshaft angle established by the variable cam timing system in a predetermined manner. Here, FIG. 6A shows the manner to be linear over the reactivation time, $\Delta_2$, it being noted above that other functions may be used during the reactivation time, $\Delta_2$, FIG. 6B illustrates a case where there are two CID sensor failures; one at time $T_1$ and the other at time $T_2$, where $T_2$ minus $T_1$ is less than $\Delta_1$ plus $\Delta_2$. This is a low frequency failure condition. Thus, in response to each sensor failure, the process operates as described above in FIG. 6A.

Figure 6C:
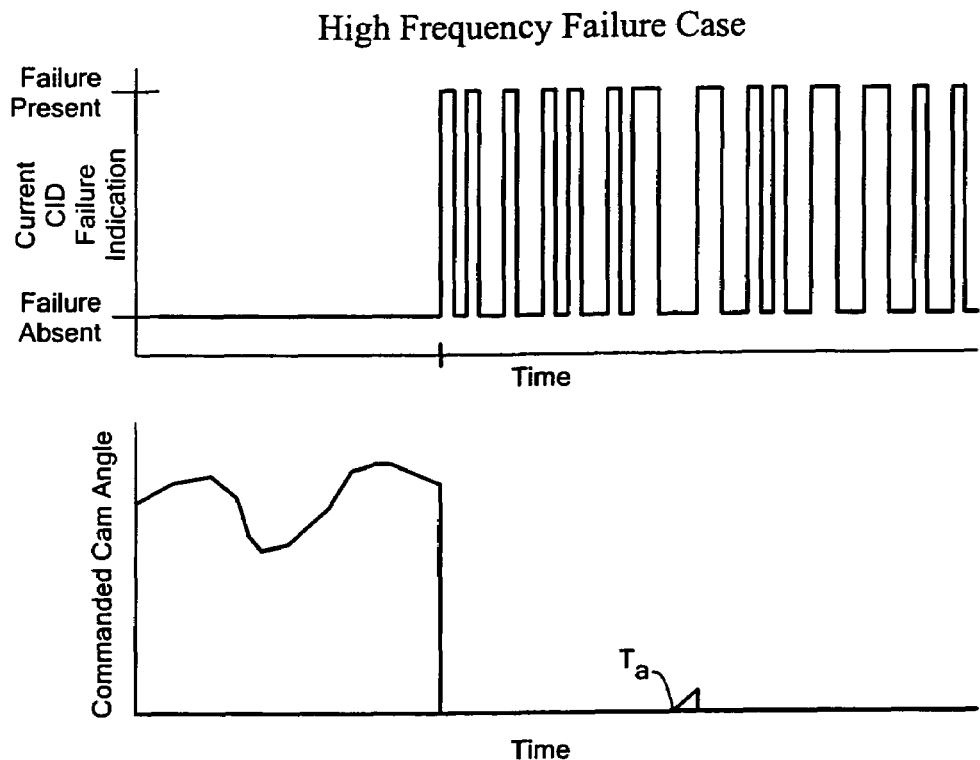

FIG. 6C illustrates a case where there are many CID sensor failures occurring within the time $\Delta_1$. This is a high frequency failure condition. Thus, here there are faults during each time $\Delta_1$ after a sensor failure and hence the camshaft angle remains at the predetermined camshaft angle. It is noted that at time $T_a$ there was sufficient time between sensor failures to being the reactivation process but a sensor failure occurred before the end of the reactivation process so the camshaft angle was set to the predetermined camshaft.

Figure 6D:
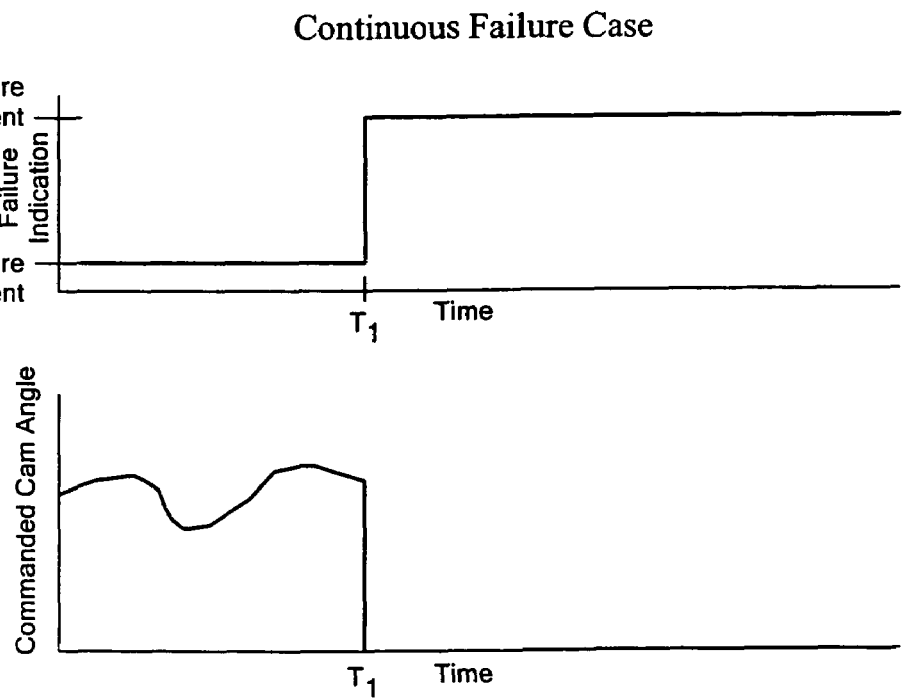

FIG. 6D illustrates a case where there is a continuous failure of the sensor beginning at time $T_1$.

Referring to FIG. 6, an automotive vehicle 10 having an engine 12 and a control system 14 is illustrated. Engine 12 includes cylinder banks 16, 18, VCT mechanisms 20, 22 and a crankshaft 24. Each of cylinder banks 16, 18 may have a plurality of cylinders, not shown. The VCT mechanisms 20, 22 are provided to actuate intake/exhaust valves in cylinder banks 16, 18. For example, the VCT mechanism 20 may be utilized to actuate intake valves, not shown, and exhaust valves, not shown, of a cylinder associated with cylinder bank 16 to control air flow entering the cylinder and exhaust gases exiting the cylinder, respectively. The VCT mechanism 20 cooperates with a camshaft 44 which for variably actuating the valves, not shown. Camshaft 44 is directly coupled to a toothed cam wheel 54 having teeth 58, 60, 64, 66. By manipulation of the hydraulic coupling in any conventional manner, the relative position of camshaft 44 to crankshaft 24 can be varied by the VCT mechanism 20. Thus, intake valve and exhaust valve open and close at a time earlier than normal relative to crankshaft 24 or at a time later than normal relative to crankshaft 24 as controlled by signals supplied by the VCT mechanism 24. The VCT mechanism 22 operates in like manner for cylinder bank 18.

The control system 14 responds to camshaft position (CID) sensors 80, 82 provided to generate signals indicative of a position of camshafts 44, 46, respectively. Sensors 80, 82 are conventional in the art and may comprise Hall-effect sensors, optical encoders, or variable reluctance sensors. The process described above in connection with either FIG. 3 or FIG. 5 is used for each one of the CID sensors, or both as a coordinated pair. As cam wheel 54 rotates, teeth 58, 60, 64, 66 equally spaced at ninety degrees (when engine 12 is a V8 engine for example) around the wheel 54 pass by sensor 80. The sensor 80 senses the passing of each tooth and generates respective electric cam pulses or position signals CAM_POS[1] which are received by control system 14. Similarly, as cam wheel 56 rotates, teeth 72, 74, 76, 78 pass by sensor 82 which generates respective electric cam pulses or position signals CAM_POS [2] which are received by the control system 14.

The crankshaft position sensor 86 is provided to generate a signal indicative of a position of crankshaft 24. Sensor 86 is conventional in the art and may comprise a Hall effect sensor, an optical sensor, or a variable reluctance sensor. A camshaft sprocket 90 is fixed to crankshaft 24 and therefore rotates with crankshaft 24. Sprocket 90 may include thirty-five gear teeth spaced ten degrees apart which results in one tooth missing that sensor 86 uses for sensing the position of sprocket 90. The sensor 86 generates position signal CS_POS that is transmitted to ignition system controller 88. Controller 88 converts the signal CS_POS into the PIP signal which is then transmitted to the control system 14. A PIP pulse occurs at evenly spaced rotational intervals of crankshaft 24 with one pulse per cylinder per engine cylinder cycle. This series of pulses comprise the PIP signal.

The control system 14 is provided to implement the method for controlling VCT mechanisms 20, 22 and in particular, for controlling the position of camshafts 44, 46 in accordance with the processes described above in FIGS. 3 and 5. Further, control system 14 is provided to compare signal CAM_POS[1] to signal PIP to determine a relative position (i.e., phase angle) of camshaft 44 with respect to crankshaft 24. Similarly, the control system 14 compares signal CAM_POS[2] to signal PIP to determine a relative position of camshaft 46 with respect to crankshaft 24. As illustrated, the control system 14 includes a CPU 94 and a computer readable storage media for storing a computer program implementing the process described above in FIGS. 3 and 5 and comprises nonvolatile and volatile storage in a read-only memory (ROM) 96 and a random-access memory (RAM) 98. The computer readable media may be implemented using any of a number of known semiconductor chip memory devices such as PROMs, EPROMs, EEPROMs, flash memory or any other electric, magnetic, optical or combination memory device capable of storing data, some of which represent executable instructions, used by microprocessor 94 in controlling engine 12. Microprocessor 94 communicates with various sensors and actuators (discussed above) via an input/output (I/O) interface 100. Of course, the present invention could utilize more than one physical controller to provide engine/vehicle control depending upon the particular application.

A number of embodiments of the invention have been described. Nevertheless, it will be understood that various modifications may be made without departing from the spirit and scope of the invention. Accordingly, other embodiments are within the scope of the following claims.

What is claimed is:

1. A method for operating an engine having a variable cam timing control system, for controlling a camshaft angle in such engine, comprising:
    setting the camshaft angle to a constant predetermined angle for a predetermined duration after failure in a sensor used to control the variable cam timing system; and
    subsequently allowing the camshaft angle to return to the camshaft angle determined by the variable cam timing system.

2. The method recited in claim 1 wherein the camshaft angle setting continues during the predetermined duration in the presence of a subsequent failure of the sensor during the predetermined duration in the absence of a sensor failure during said predetermined duration.

3. The method recited in claim 1 wherein the camshaft angle setting continues during the predetermined duration in the presence of a subsequent failure of the sensor during the predetermined duration.

4. The method recited in claim 3 wherein the allowing the camshaft angle to return to the camshaft angle determined by the variable cam timing system comprises driving the cam angle to a camshaft angle established by the variable cam timing system in a predetermined manner.

5. The method recited in claim 4 wherein the allowing the camshaft angle to return to the camshaft angle determined by the variable cam timing system occurs over a predetermined reactivation time.

6. The method recited in claim 4 wherein the predetermined manner is a series of incremental step changes in camshaft angle.

7. The method recited in claim 4 wherein the predetermined manner is a ramp-like change in camshaft angle.

8. The method recited in claim 4 wherein the predetermined manner is function of a difference between a camshaft angle established by the variable cam timing system and a current camshaft angle.

9. The method recited in claim 8 wherein the function is a polynomial.

10. The method recited in claim 8 wherein the function is an exponential function.

11. A method for operating an engine, comprising:
    maintaining camshaft angle substantially constant for up to a predetermined duration in response to a sensor failure.

12. The method of claim 11, further comprising:
    resuming normal camshaft control in the absence of a sensor fault during said predetermined duration.

13. The method of claim 11, further comprising:
    commanding said camshaft toward a default position along a trajectory in response to a sensor failure detected during said predetermined duration.

14. The method of claim 13 wherein said trajectory is a step function.

15. The method of claim 13 wherein said trajectory comprises multiple steps.

16. The method of claim 13 wherein said trajectory comprises a smooth function.

17. The method of claim 11 wherein said predetermined duration is a time period.

18. The method of claim 11 wherein said predetermined duration comprises a predetermined number of engine revolutions.

19. The method of claim 11, further comprising:
    setting the camshaft angle to a predetermined angle for a predetermined detection window duration when a sensor failure occurred within said predetermined duration; and
    subsequently allowing the camshaft angle to return to the camshaft angle determined by the variable cam timing system.

20. A method for operating an internal combustion engine having a variable cam timing control system, for controlling a camshaft angle in such engine, comprising:
    (a) monitoring a sensor used to control the variable cam timing system;
    (b) in response to detection of a sensor failure, driving the camshaft to a constant position in a first predetermined manner over a first predetermined time $\Delta_1$, maintaining the constant position for a second predetermined duration;
    (c) determining whether there has been a sensor failure within the second predetermined duration from the last sensor failure;
    (d) in the absence of a sensor failure within the second predetermined duration from the last sensor failure, driving the camshaft to the camshaft position determined by normal control system operation, otherwise, determining whether there has been a lapse since the last sensor failure that exceeds the first duration; otherwise, if there has been a lapse, maintaining the constant position for a second predetermined duration; and returning to (c);
    (e) if the absence of a failure detected in (c), determining whether there has been a lapse since the last sensor failure which exceeds the first predetermined duration, driving the camshaft to the camshaft position determined by normal control system operation.

21. A method for operating an internal combustion engine having a variable cam timing control system, for controlling a camshaft angle in such engine, comprising:
    (a) monitoring a sensor used to control the variable cam timing system;

(b) in response to detection of a sensor failure is detected, maintaining the camshaft at the constant angle determined at the time of the sensor failure for a first predetermined duration;
(c) determining whether there has been a sensor failure within the first predetermined duration from the last sensor failure;
(d) if there has been a failure during the first predetermined duration:
  (1) the driving the camshaft to a constant position in a first predetermined manner over a first predetermined time $\Delta_1$, and maintaining the constant position for a second predetermined duration;
  (2) determining whether there has been a sensor failure within the second predetermined duration from the last sensor failure;
  (3) in the absence of a sensor failure within the second predetermined duration from the last sensor failure, driving the camshaft to the camshaft position determined by normal control system operation, otherwise, determining whether there has been a lapse since the last sensor failure that exceeds the first duration; otherwise, if there has been a lapse, maintaining the constant position for a second predetermined duration; and returning to (2);
(e) if the absence of a failure detected in (c), determining whether there has been a lapse since the last sensor failure which exceeds the first predetermined duration:
  if there has been a lapse, driving the camshaft to the camshaft position determined by normal control system operation;
  otherwise, if there has not been a lapse, maintaining the constant position for a second predetermined duration; , maintaining the camshaft at the angle determined at the time of the sensor failure for a first predetermined duration and returning to (c).

22. An article of manufacture comprising:
a computer storage medium having a computer program encoded therein for operating an engine having a variable cam timing control system to control a camshaft angle comprising:
code for setting the camshaft angle to a constant predetermined angle for a predetermined duration after failure in a sensor used to control the variable cam timing system; and
code for subsequently allowing the camshaft angle to return to the camshaft angle determined by the variable cam timing system.

* * * * *